May 25, 1948.　　　　G. R. HAMEL　　　2,442,291
AIR-PROPELLER WITH AUTOMATICALLY VARIABLE PITCH
AND DIAMETER AND CONTROLLED PITCH VARIATION
Filed April 7, 1945　　　5 Sheets-Sheet 1
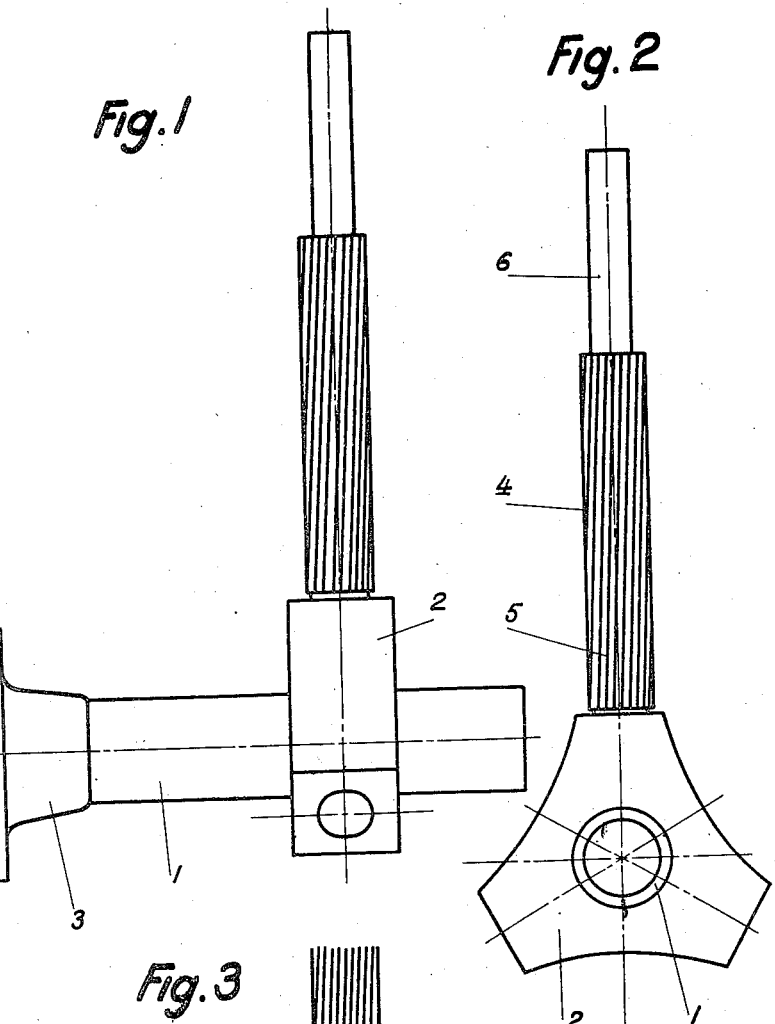
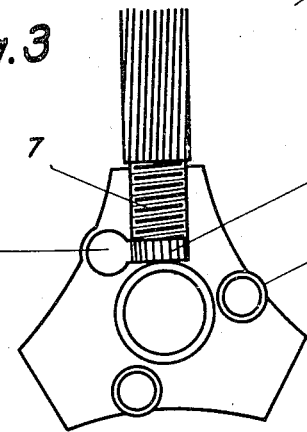
Inventor:
Georges Roger Hamel
per Fred F. Barlow
Attorney

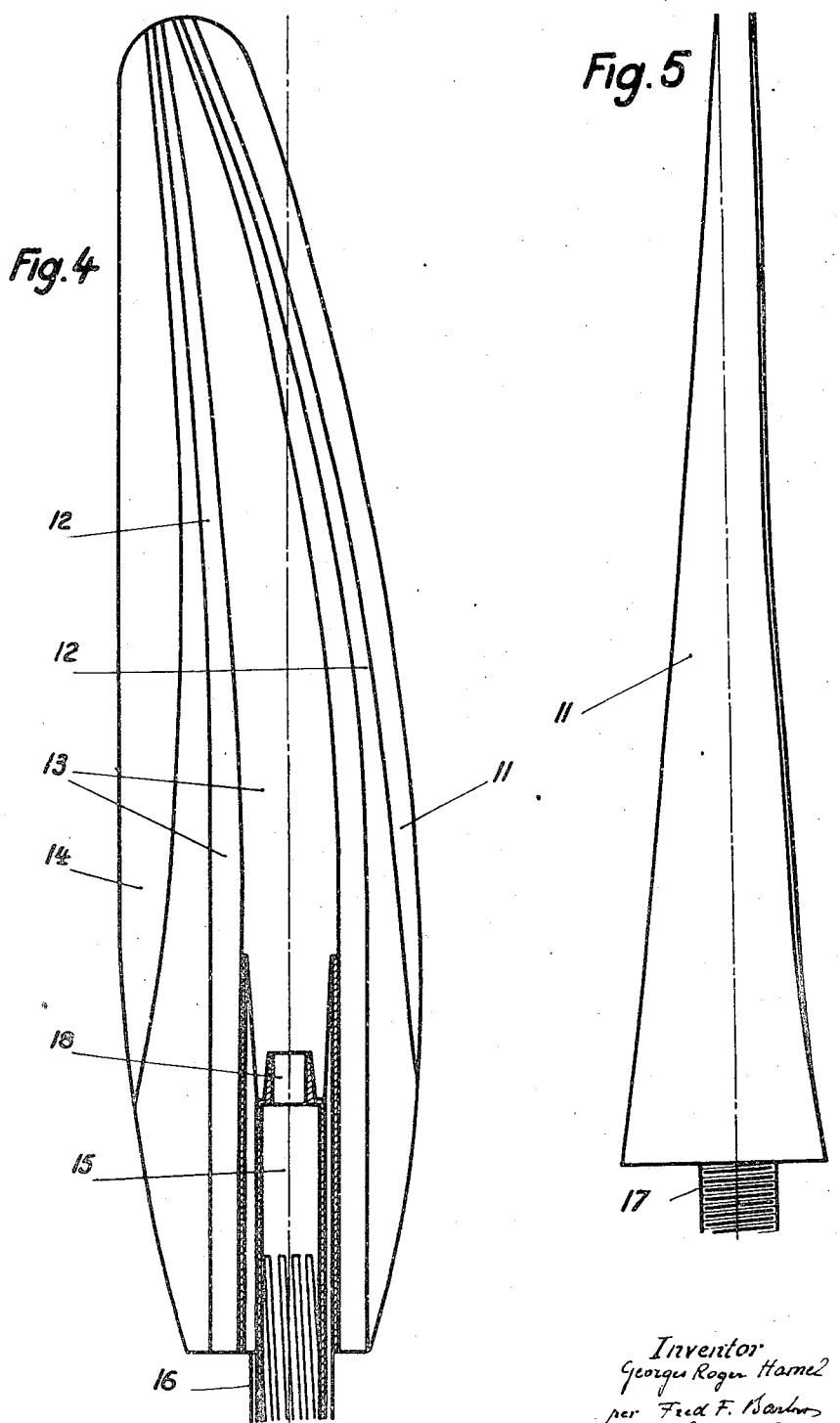

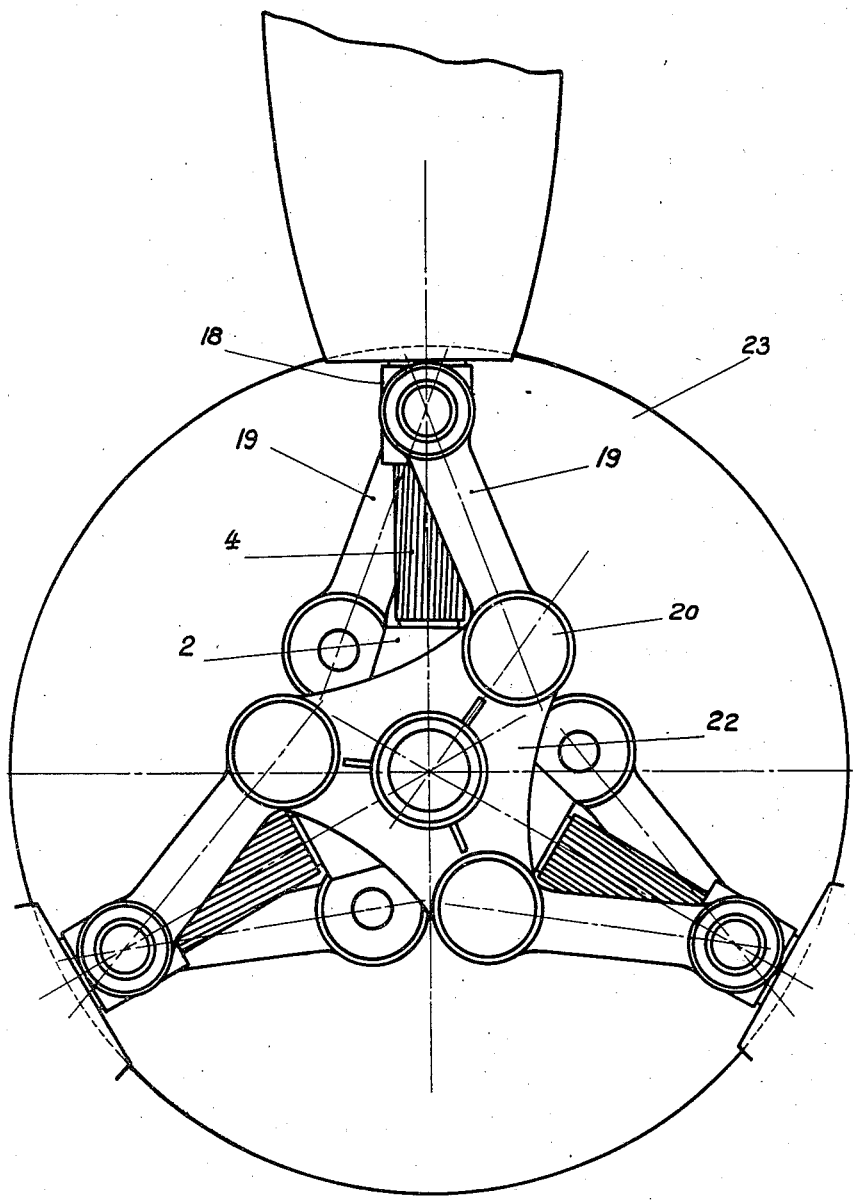

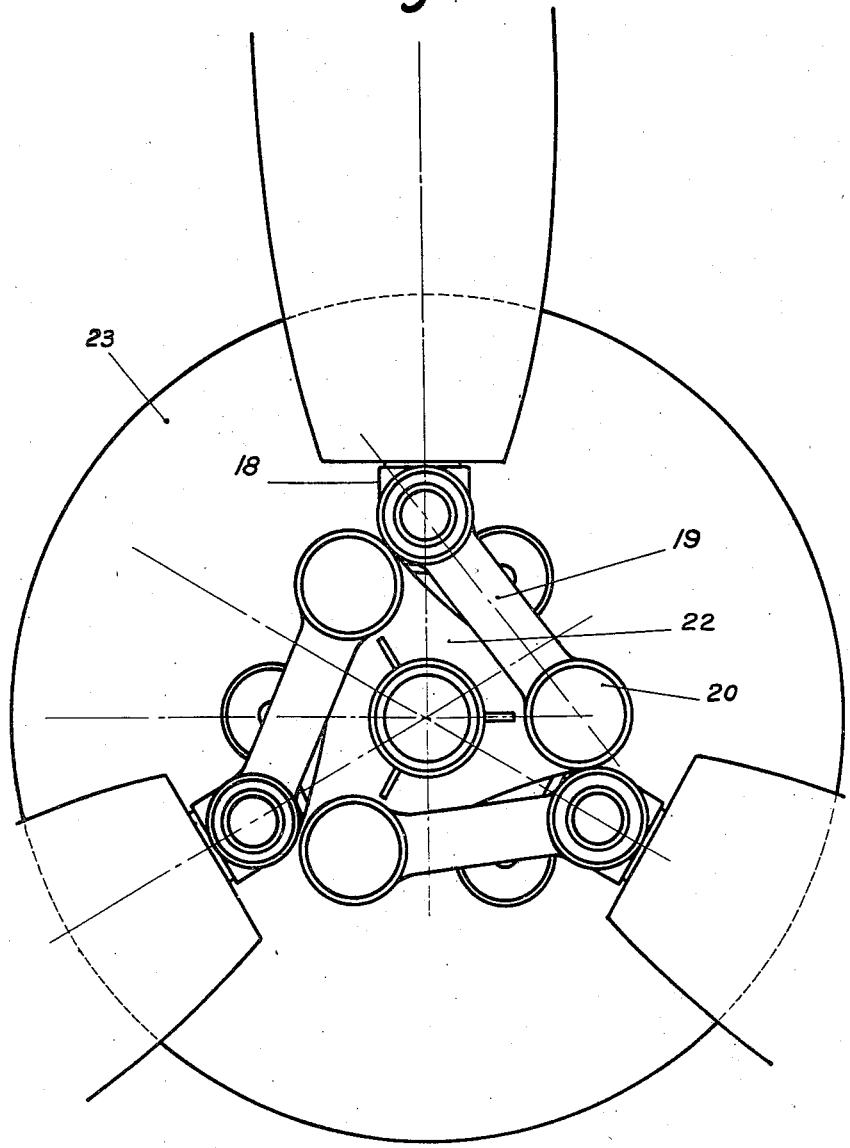

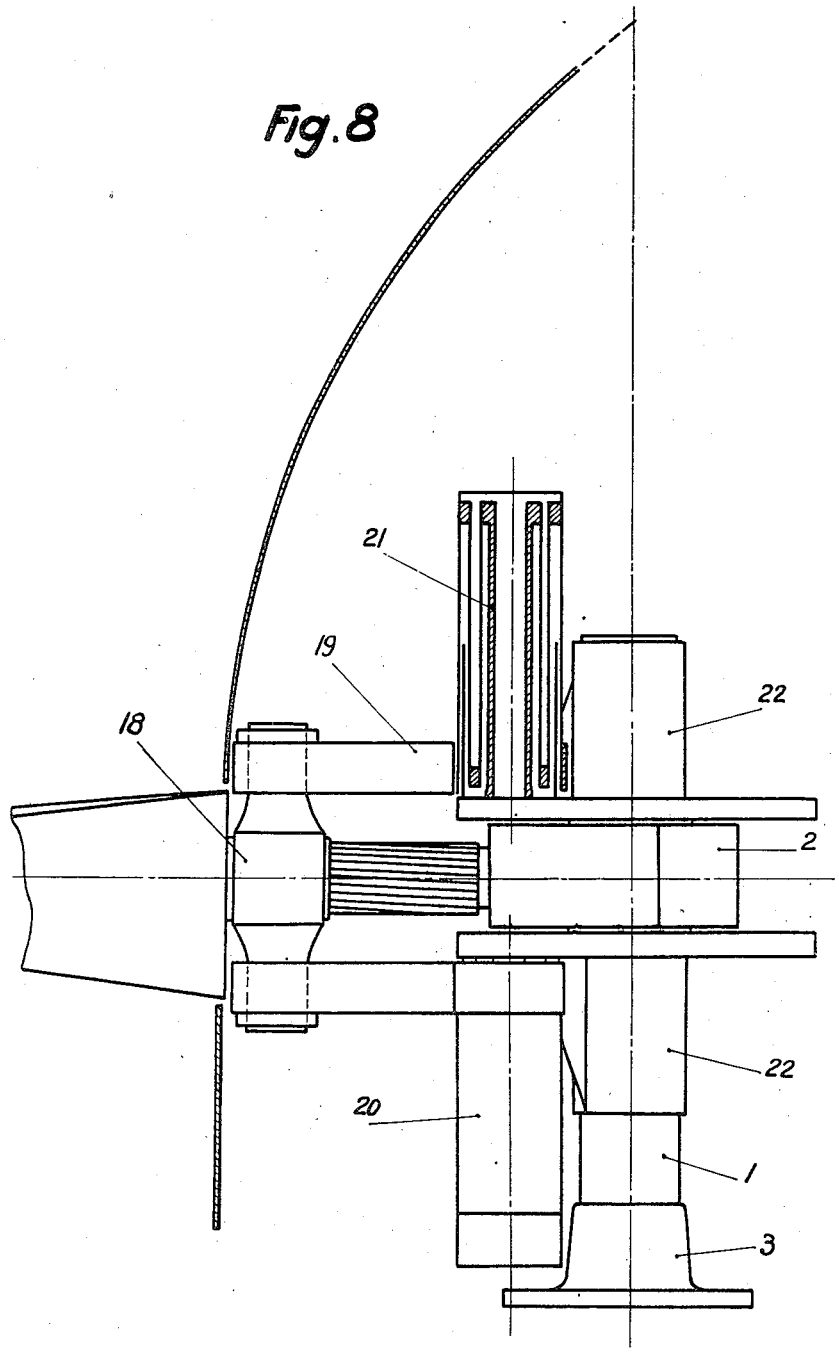

Patented May 25, 1948

2,442,291

UNITED STATES PATENT OFFICE 2,442,291

AIR PROPELLER WITH AUTOMATICALLY VARIABLE PITCH AND DIAMETER AND CONTROLLED PITCH VARIATION

Georges Roger Hamel, Paris, France

Application April 7, 1945, Serial No. 587,172
In France February 4, 1941

2 Claims. (Cl. 170—160)

The problem of a proper adaptation of a propeller to an aircraft becomes every day more and more difficult for the reason that an ever greater difference is sought for between the speed at the moment aircraft leave the ground and the speed reached by said aircraft in normal flight, the common tendency being to-day to utilize various types of aircraft with an ever higher traffic speed.

If the screw-propeller is well adapted to the speed and to the altitude chosen normally for the aircraft, the results obtained during the ascent and particularly at the moment of the take-off, will be insufficient, on the one hand, because, in consequence of the decreasing translation speed, the propeller blade will then work with too great an angle; the profiles will be found thus in an unsatisfactory zone, in view of the quotient $$\frac{Cz}{Cx}$$

(generally expressed by $$\frac{L}{D}$$

wherein L represents lift and D represents drag). On the other hand, owing to the increase of $Cx$ resulting therefrom, the air propeller will exert too strong a braking effect on the motor, which prevents said motor from delivering a sufficient power at the moment when it would be most necessary.

Aircraft builders are now trying to prevent partially such a disadvantage with the variable pitch propeller, said modification being obtained by rotation of the propeller blade in its hub, in order to modify the angles between said hub and the various profiles and consequently to keep them near the range where the quotient $$\frac{Cz}{Cx}$$

reaches a satisfactory value. The unfavourable consequence of the variation of the translation speed may thus be prevented.

In fact, it is not possible to prevent such a disadvantage, for it should be necessary, in order to keep a correct helicoidal surface, to reduce the rotation angle of said propeller blade in proportion as the part of said blade is situated farther from the hub, which should involve, as an inevitable consequence, a buckling and a twisting of said blade, which may hardly be contemplated. Therefore with the variable pitch propellers, the whole blade turns as a sole block, which gives an imperfect solution to the aforementioned problem.

Moreover such propellers, by no means, prevent the effect resulting from variations of altitude. Now, in order to utilize fully the power of the motor, it is necessary, at a certain altitude, to work on a larger air cylinder, in order to counterbalance the effect resulting from the decrease of air density. The diameter of a screw-propeller should, for this reason, increase according to the flight altitude and decrease when the aircraft is flying down nearer to sea level. That signified but little formerly, for the power delivered by the motor decreased in proportion as the altitude became considerably greater, but to-day when all motors are provided with a device to restore their normal power even at the highest altitudes, such a consideration becomes of first rate importance.

Consequently the provision of a propeller with accurate variation of diameter and pitch along its radius would constitute a considerable improvement. The increase of efficiency for the low speeds, that would result therefrom, would make it possible to obtain improved conditions of speed during the ascent and to better the conditions of take-off, which would make equally possible an increase in the effective weight and more advantageous conditions for aerial traffic.

Such considerations are true not only for the aircraft provided with wheels (land planes), but they shall find perhaps a larger field of application for the seaplanes for which the maximum of the whole resistance requiring the strongest tractive effort corresponds to a speed that is between four-tenths and five-tenths of the speed at the moment when said planes are leaving the water-surface, regardless of the hydrodynamic resistance of the hulls of seaplanes.

It is desirable that, by means of such a propeller, the motor shall always run at a speed for which its efficiency reaches the best value and that the device designed to control the variations of diameter and of pitch shall be simple and strong, without frail or delicate members which easily get out of order.

It is desirable also that such an appliance shall work automatically without intervention of the pilot and without necessity of a supplementary hand drive on the dash-board, which, on modern air-craft, is already overloaded.

Moreover, for the traffic on board of big aircraft having several motors and on board of seaplanes, it is desirable that the pilot may, in particular circumstances: (a) in case of engine break-down render the propeller blades inactive, and, (b) in order to perform his evolutions on the water surface, dispose said blades in such a manner that they form, with the hub, any desired angle (positive, negative or null).

The present invention fulfills the above mentioned desiderata.

The hereinafter described appliance constitutes consequently an important improvement with respect to previously known means by which the variation of the diameter of the propeller blades is effected by means of a remote control device, operating by the help of gearing, complicated, bulky and heavy and under considerable strains, since said device has to resist the centrifugal force, instead of counterbalance it, which is the effect obtained by means of the appliance constituting the object of the present invention.

Some inventors have tried to solve the aforementioned problem by means of an appliance in which the increase of diameter is obtained by the effect of the centrifugal force with a simultaneous variation of pitch, but such an embodiment was not mechanically realizable, the variations contemplated being very limited and the surfaces provided to support and to guide the various members of said embodiments being not sufficient for that purpose. Moreover the roots of the propeller blades are stationary, so that the pilot cannot shift them, in order to reverse the direction of the propeller, or to make it inactive, as described hereinafter in the embodiment according to the present invention.

Said invention will be easily understood in view of the accompanying drawings which are given by way of example and in which:

Fig. 1 illustrates a side view of the propeller hub,

Fig. 2 is a front view of the hub,

Fig. 3 shows how the arm of said hub is mounted in the body of the latter, when said arm is provided with a device controlling the pitch variation, Fig. 4 is a cross section of a propeller blade, Fig. 5 is a side view of a propeller blade.

Fig. 6 shows the device for controlling the variation of diameter and pitch in stretching position, Fig. 7 illustrates the same device after it has been folded up.

Fig. 8 is a side view of the same device.

According to the present invention, the propeller is constituted as follows:

It comprises a central tubular shaft 1, driven by the motor by means of a plate 3 mounted on one of its ends.

Said shaft 1 is integral with the body of the hub 2 provided with as many holes as there are blades on the propeller.

In said holes are secured tubular arms 4, provided on the surface with helicoidal grooves 5 and with extensions—in order to guide said blade, when it must be stretched (Figs. 1 and 2).

Figs. 4 and 5 illustrate an example of said blades characterized by a box-shaped beam constituted of two U-shaped cores 12 and of two soles 13 to which coating 14 is applied.

Members 12 transmit the mechanical strains to a sleeve 15 the suitably bored end 18 of which is positioned on the extension 6, said sleeve 15 having on its inner surface 16, the reproduction in relief of the helicoidal grooves 5 disposed in the surface of arm 4.

The exterior surface of the base of sleeve 15 is provided with a thread 17 designed to receive the ring provided with trunnions 18 which appear in the Figs. 6, 7 and 8.

The various elements of which the blade is made up may be constituted of sheets of ordinary steel, of special or rustproof steel, or of sheets of various light alloys, the assembling of said sheets being performed by riveting or by welding. The propeller blade may be constituted of ordinary or treated wood as well as of light forged metal, since said propeller may be provided, in any case, with the sleeve 15 serving as the member designed to vary pitch and diameter.

A type of construction characterized by the use of hollow blades made up of sheet-metal may be contemplated favorably also, since such a construction permits one to obtain a hollow body, inwardly reenforced and ensuring, for the most reduced weight, the maximum of solidity. The most important part, of which said blade is made up, is disposed thus closely to the outline of the profiles and consequently removed from the neutral axis.

Due to the lightness thereby obtained, it becomes possible to reach the three following advantages:

(a) The total weight of the propeller is reduced;

(b) The intensity of the strains exerted on the device is equally reduced, since the value of the centrifugal force will be found lessened in consequence of the lightness of said blades;

(c) The stress on the shaft controlling the propeller, as well as on its bearings, is minimized, said stress being the consequence of the gyroscopic effects which arise during the succession of rapid movements of the aircraft.

On the other hand, since the central shaft 1 and the arms 4 are hollow and since the central beam of said blade is also hollow, it is possible to permit the spent gases coming from the exhaust of the motor to pass through said hollow beam and to give to the end of said beam the shape of a nozzle conveniently directed, improving thus the efficiency of the motor-propeller group, taking advantage of the effect produced by the exhaust of the spent gases, such a disposition ensuring, besides, a very efficient process to prevent the formation of white frost.

Finally it is pointed out that, according to the kind of construction above proposed, the mechanical strains are transmitted progressively from the outer surface of the propeller to the central beam and then to the sleeve 15, which in turn transmits them to the suitable device a description of which is given hereinafter, and that said kind of construction is free from the deficiencies of the old hollow propeller blades of steel in which the mechanical strains are transmitted to the hub by the outer surface of the blade itself, strengthened by inward pieces of metal. In order to introduce into the hub the root of said blade, an abrupt change of section was provided said root the section of which corresponding, on the outside of the hub, to the shape of said blade, was transformed, in the interior of said hub, in a smaller circular section. By reason of such construction, the mechanical strains (or the fatigue) constantly repeated at that place caused, as an inevitable consequence, the breaking of the blade at its root.

The new process of construction, according to which hollow propeller blades are made up and which constitutes the object of the present invention, eliminates entirely such a deficiency, realizing thus an important improvement.

The sliding connection provided, by means of sleeve 15, between the propeller blade and the arm of the hub, forms, due to the grooves 5 and 16, the device controlling simultaneously the variations of diameter and of pitch.

In fact, under the action of centrifugal force, the propeller-blade tends to move away from the hub, which involves an increase of diameter and, to a certain extent, a corresponding increase of pitch.

By sliding along arm 4, grooves 5 and 16 force the propeller blade to rotate on its axis, which brings on a variation of angle between said propeller blade and said axis and consequently a new increase of pitch.

The combined variations of diameter and of angle (between blade and axis) permit variation of the pitch and maintenance of an helicoidal surface perfectly correct, a result which cannot be obtained by prior variable pitch propellers, which operate only by means of the rotation of their blades and consequently by means of the variation of the angle between said blades and their axis.

Let us consider now two sections of a blade, the former at the distance D from the centre of rotation of the propeller and the latter at the distance 4D. If the same pitch is required for said sections, α being the angle (between blade and axis) corresponding to the section D, that corresponding to the section 4D will be α/4.

If the blade rotates through an angle of α/5, the section D forms now an angle of α+α/5, namely, 24α/20, which corresponds to an increase of 20% with respect to the former direction of the blade.

The increase of section corresponding to 4D, has been equally of α/5; consequently the corresponding angle becomes equal to α/4+α/5, namely, 9α/20, which corresponds to an increase of 80% with respect to the former direction of the blade in question.

It is easy to conceive that, under such circumstances, it will be impossible to obtain a regular and perfect helicoid.

Let us suppose now that the increase of pitch is obtained only by means of the increase of diameter and that, for each blade, that increase is 4/5D, for the section D the radius of gyration becomes D+4/5D, or 9/5D, which corresponds to an increase of 80% for the circle described and consequently for the pitch.

At the section 4D we shall have 4D+4/5D, namely, 24/5D, which corresponds to an increase of no more than 20%.

Therefore it is easy to conceive that by obtaining a simultaneous variation of diameter and of pitch and by giving a suitable inclination to grooves 5 and 16, it will be possible to combine the above mentioned effects and to have a pitch increasing regularly along the whole blade, obtaining thus 20%+80%, namely, 100% for D and 80%+20%, namely 100% for 4D.

Consequently an important improvement is obtained thus with respect to the propeller which operates only by the effect of a variation of the angle between the blades and their axis.

Such a stretching (of said blades) shall be the same for all blades, in order to maintain the propeller perfectly balanced, with respect to the centrifugal strains as well as to aerodynamical forces.

In order to reach such a result, each blade mounted on its arm, is connected by means of its ring 18, carrying its trunnions, and of two small connecting rods 19, to two collars 22, concentrically disposed on the tubular shaft and capable of rotating about said shaft.

Each small connecting rod supports at its end, in the side of said collars, a tubular sleeve 20, fitted in a guiding sleeve which forms a brake with member 22.

With such a disposition, the centrifugal force will give, as an inevitable consequence for all screw or propeller blades, the same variation of angle and the same shifting along their arms. Thus, the propeller remains perfectly balanced.

The increase of diameter and of pitch must occur only beyond a certain speed of rotation of the motor and remain between the limits which have been appointed.

According to one of the most important features of the invention, such a result may be obtained by interposing between a blade and the hub an elastic connection of which the present specification gives hereinafter an example, having the shape of a tubular telescopic bar working under the effect of torsional strains.

Member 22, at the centre where the sleeve 20 of each little connecting rod swivels on its pivot, carries a central pipe, connected to said sleeve by means of a series of other concentrical tubes 21, according to the disposition shown in Fig. 8. Said pipes 21 correspond to a single pipe, very long, working as a torsion bar and counterbalance thus the centrifugal force, by braking the angular shifting of the small connecting rods 19.

Tubes 21 are mounted with a certain initial tension, which does not permit the swiveling of said small connecting rods on their pivots and, consequently, prevents any shifting of blades along arm 4, before the motor reaches a given speed and before centrifugal force, equally, reaches a sufficient value.

Said tubes 21 may be split longitudinally in order to increase the value of their angle of elastic torsion, if necessary.

Any other arrangement of elastic connection may, of course, be provided; but tubes submitted to a torsional stress have been chosen here, in consideration of their simplicity and of their lightness.

The whole device may be stream-lined and shielded by a suitably shaped sheet-metal 23.

On the whole, the device provided is quite simple; it operates without the help of any remote mechanical control, as well as without electricity or any fluid under pressure. The axis of the hub is tubular and entirely cleared, which offers the possibility either of installing an exhaust device for spent gases, as above described, or for other applications, of providing two concentric propellers, or of fitting up a gun which passes along the axis of the tubular shaft 1 and fires through the inside of said shaft.

Such a disposition affords the possibility of carrying out the following operations:

Since the member controlling the variation of pitch, namely arm 4, operating by means of grooves 5, is not submitted to the strains resulting from the centrifugal force, due to the ring 18 carrying trunnions, and due to the small connecting rods 19 and the elastic connections 21, it becomes very easy to set said arm swivelling in its casing, which forces propeller blades to rotate in the ring 18 carrying said trunnions.

For that purpose, arm 4, mounted on the body of the hub by means of the thread 7, is provided at its end with teeth forming a spur-wheel 8, which engages with a rack, teeth of which have been cut on the surface of a rod 9 sliding in a casing 10.

Rods 9 are connected to a collar which may slide on sleeve 1, driven by said sleeve in its motion of rotation and the longitudinal shifting of which is controlled by any suitable kinematic device, for instance, by a fork similar to the motor-car disengaging forks. Said fork may be operated, either by a counter-shaft controlled by a member of the crew, or by a servo-motor.

A pilot may thus, during operation of the motor, pass from a pitch equal to nought to a pitch infiintely increased and choose any positive or negative value of pitch which he shall consider suitable.

He can thus, with a pitch equal to nought, try out his motor on the ground or on the water surface; and with a pitch infinitely increased to put out of action the shaft of a motor that is damaged or necessary to be stopped, and, setting the propeller in the position corresponding to the minimum of resistance for the running ahead of said propeller, taking a positive or negative value of the pitch, to perform his evolutions (or to taxi) on the ground or on the water surface.

He can fly normally, utilizing a positive or negative value of said pitch and, finally, with a negative pitch, obtain the most energetic braking and consequently brake his aircraft for the landing on the ground or on the water-surface, perform an attack in a vertical dive without exceeding the limit of speed and so on.

Having now described my invention, what I claim is:

1. A propeller, including a hub, a plurality of radial arms mounted on the hub and each having helical splines thereon, a hollow blade mounted on each arm and having a sleeve in its root end, splines interiorly of said sleeve slidably engaging the said splines on said arm, a trunnion attached to the root end of each blade and having swivel means permitting axial rotation of said blade for changing the pitch upon longitudinal movement on said arm, a pair of plates rotatably mounted on the hub on opposite sides of the plane of said arms, a plurality of torsionally resistant means mounted on each plate corresponding in number to the number of blades, a rod at each end of each trunnion connected to an adjacent torsionally resistant means, the said means on said plates urging the latter to rotate in opposite directions and in turn effecting diametral adjustment of the propeller and corresponding pitch adjustment of each blade with variation in speed of rotation of the propeller.

2. A construction as defined in claim 1, wherein the said arms mounted on the hub are adjustable by rotating them on their longitudinal axes, thereby changing the relative position of the splines on said arms and the sleeves in said blades.

GEORGES ROGER HAMEL.

REFERENCES CITED

The following references are of record in the file of this patent:

UNITED STATES PATENTS

| Number | Name | Date |
|---|---|---|
| 1,533,467 | Sargent | Apr. 14, 1925 |
| 1,800,112 | Starz | Apr. 7, 1931 |
| 1,919,586 | Dodge | July 25, 1933 |
| 1,973,573 | Lougheed | Sept. 11, 1934 |
| 2,029,503 | Peterson | Feb. 4, 1936 |
| 2,353,190 | Rupp | July 11, 1944 |